(No Model.)
J. V. HOTCHKISS.
CROSSCUT SAW.
No. 494,103. Patented Mar. 21, 1893.
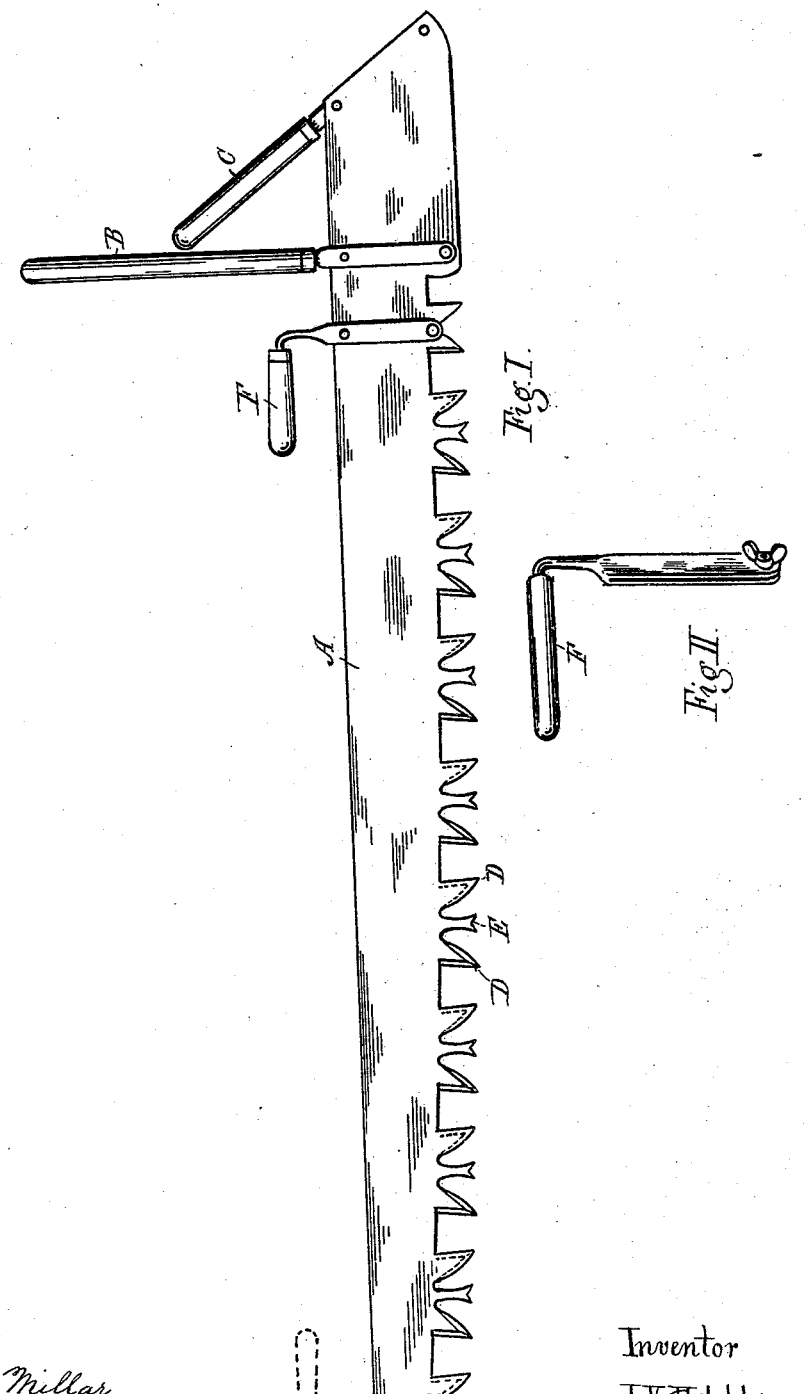
Witnesses
R. S. Millar
L. M. Adams
Inventor
J. V. Hotchkiss
By O. H. Bailey Atty

UNITED STATES PATENT OFFICE.

JOSEPH V. HOTCHKISS, OF JAY, ASSIGNOR OF ONE-HALF TO HENRY KEHLENBECK, OF PLEASANT, INDIANA.

CROSSCUT-SAW.

SPECIFICATION forming part of Letters Patent No. 494,103, dated March 21, 1893.

Application filed October 15, 1892. Serial No. 449,015. (No model.)

*To all whom it may concern:*

Be it known that I, JOSEPH V. HOTCHKISS, a citizen of the United States, residing at Jay, in the county of Switzerland and State of Indiana, have invented a new and useful Improvement in Crosscut-Saws, which improvement is fully set forth in the following specification and accompanying drawings, in which—

Figure 1 is a side elevation of my improved cross-cut saw, and Fig. 2, a detail view of the supplementary transferable handle.

My invention relates to improvements in cross-cut saws in general and especially to the class adapted for felling timber and for heavy work of every description.

My object is to provide a simple, inexpensive and effective device which may be operated by one man and will perform, with less labor and in less time, an amount of work which would require the combined power of two men with saws as formerly constructed.

The invention consists in the peculiar form, arrangement and relative position of the teeth as illustrated in the accompanying drawings in which A designates the blade of the saw provided at one end with handles B and C which are located and attached in such manner that the operator may conveniently use one or both hands. The teeth are arranged in triplets composed of two cutting teeth D D, and a double pointed raking or clearing tooth E. The outer or vertical edges of the cutting teeth stand approximately at right angles to the blade and are beveled, in reverse, throughout their entire length. A cutting edge is thus formed which pares off the sides of the kerf sufficiently to prevent binding and consequent friction. The inner or sloping edges are also beveled as shown. A sharp tapering point is thus produced which in connection with the sharpened edge as herein described, effects a clean smooth cut instead of the scraping action of teeth as heretofore constructed, and the clearing teeth being exposed to a greatly reduced resistance are enabled to perform their work with ease.

If desired, the saw may be made of any preferred length and readily adapted for two operators by attaching a supplementary handle F to the free end thereof. This handle may be bent in line with the blade of the saw as shown in the drawings or stand at right angles thereto in the usual manner. It may also be transferred and used to advantage in connection with the fixed handles B and C.

What I claim as new is—

A cross cut saw provided with a series of teeth arranged in triplets composed of two cutting teeth and between them a double pointed raking tooth, the outer vertical edges of the cutting teeth standing approximately at right angles to the blade and beveled, in reverse, throughout their entire length, substantially as described.

In testimony that I claim the foregoing I have hereunto set my hand, this 27th day of September, 1892, in the presence of witnesses.

JOSEPH V. HOTCHKISS.

Witnesses:
RICHARD H. SMITH,
JOHN O. SMITH.